United States Patent Office 3,501,970
Patented Mar. 24, 1970

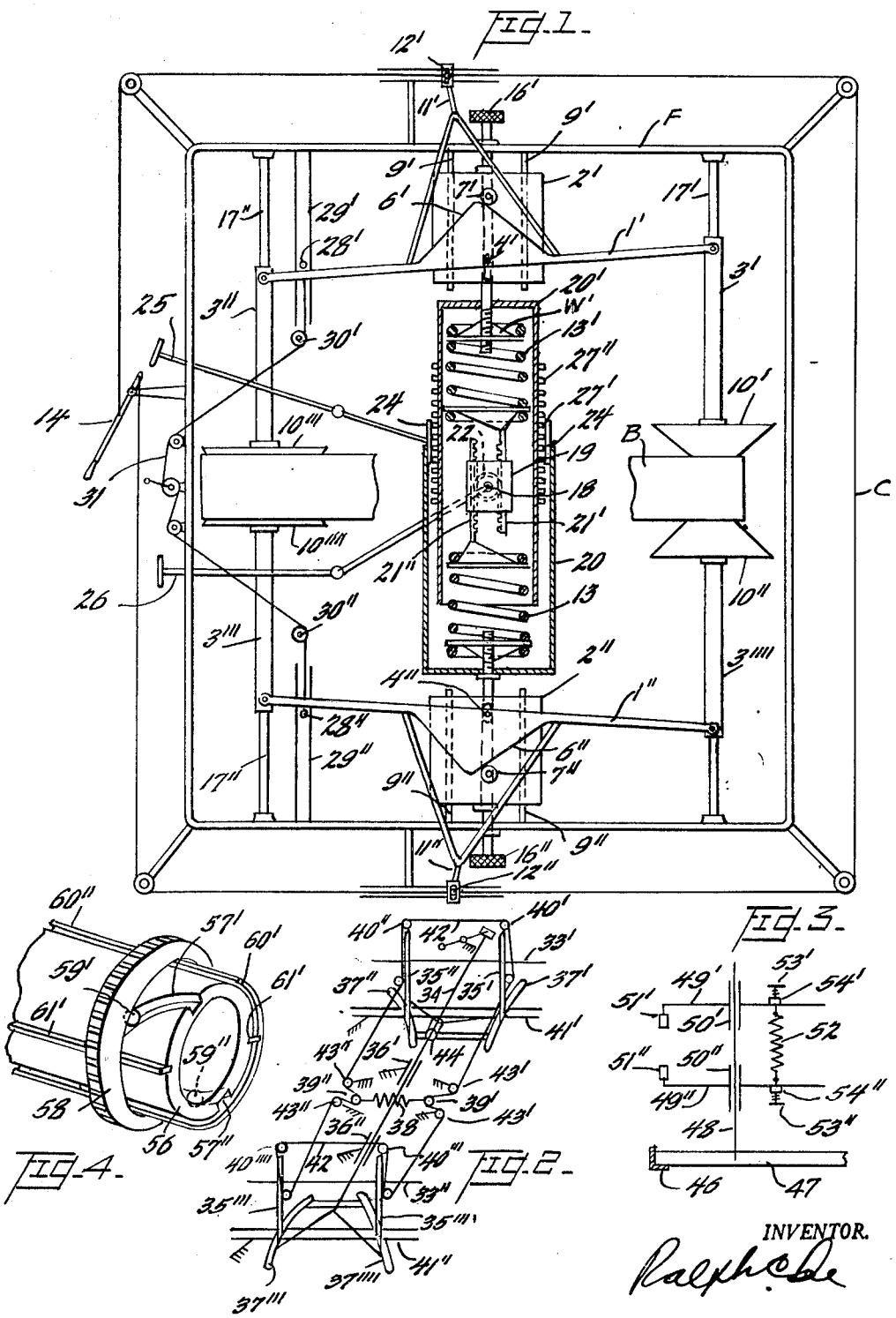

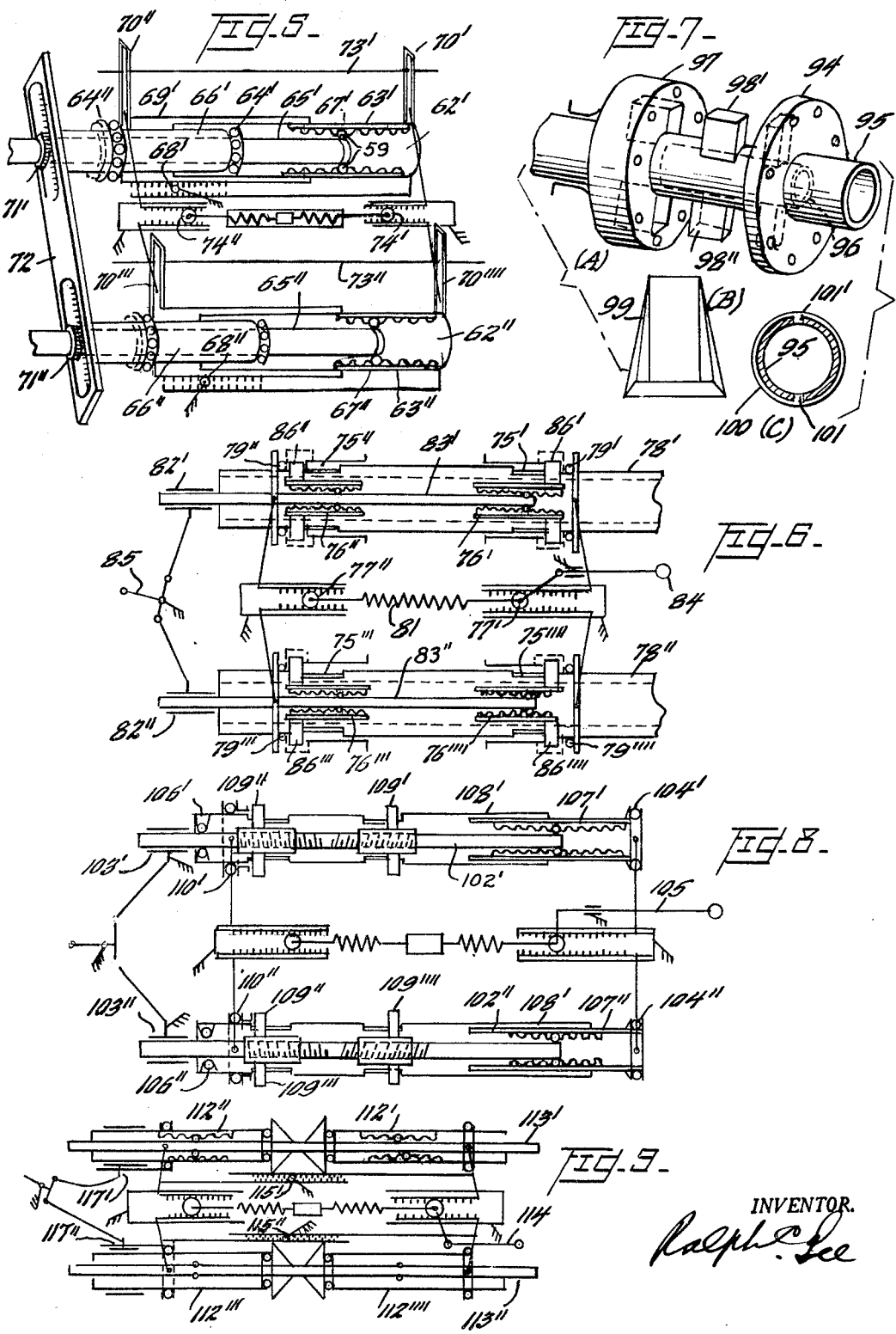

3,501,970
INFINITELY VARIABLE BELT TRANSMISSION MEANS
Ralph C. Lee, 1901 Wyoming Ave. NW., Washington, D.C. 20009
Filed Sept. 2, 1966, Ser. No. 577,054
Int. Cl. F16h 55/56
U.S. Cl. 74—230.17                    15 Claims

ABSTRACT OF THE DISCLOSURE

A variable speed control for two parallel shafts each having a pulley made of pulley elements which may be conical and interconnecting means for the pulley elements to make one pulley increase in size while the other reduces in size and a belt interconnects the pulleys, the invention providing for compensation for the difference in effective lengths of an ideal belt with respect to the varying diameter pulleys with such interconnecting means including cam means for controlling the change of size of the pulleys and yieldable means acting with the interconnecting means to maintain the desired force between the pulleys and the belt.

---

This invention primarily concerns thrust elements and apparatus for directing and controlling their force potential. It has direct application as equipment for transmissions with gearing ratio infinitely variable within limits, and examples of such transmission so equipped form part of the invention.

Without going into abstruse details, the subject type transmission commonly uses either a flexible belt, chain of some sort, or a steel ring for communicating torque from one to the other of two pulleys, gear ratio is a matter of relative size of the two pulleys, but change limited to changing only this particular relativity has the undesired side effect of altering the combined magnitude of belt-contacting portions of the two pulleys and hence the tension of the belt. The present invention offers ways to meet this and other difficulties by using apparatus which is functional in two phases.

More specifically, thruster apparatus of the invention in combination with known transmission arrangements and with other transmission arrangements included in the invention provides the following options: (1) when using a Phase I programmer patterned to provide variations in total combined pulley size keyed to variations in relative size, Phase II force potential may be "locked down" at a given level of belt tension and that level will prevail non-resiliently throughout the range of gear ratios; (2) when using a Phase I programmer patterned for desired variations not necessarily keyed only to pulley size relativity, Phase II may be locked down as above and the pre-programmed variations in belt tension will occur non-resiliently altogether under Phase I programming; (3) under either of the above programmer options Phase II force in resilient form may be set at a given level of belt tension and will then serve as a means to absorb or to damp tensional shocks; (4) still with above Phase I options open, Phase II force is at all times adjustable, thereby providing an over-riding control super-impossible upon Phase I programmed control; (5) although probably superfluous in most installations, arrangements are offered providing differential control of pulleys with respect to special behavior of *drive* pulleys as contrasted with *driven* pulleys.

The programmer device of the invention is in structure a cam guide of a type which can be either detachably secured on or formed in or on a supporting element. The number of possible camming arrangements is so large that only a few will be described by way of example. The programmer cam guide element or elements may be secured in place by means of bolts, screws, dowels, splines, spindle-nuts or other appropriate means whereby a mechanic in the field can with relative ease remove one programmer and install another with either the same or a different pattern. Thus transmissions so equipped are more versatile as well as perhaps more economical in the long run by virtue of being more repairable in the field.

Thruster apparatus of the invention is adaptable to the various forms of motorized activation, as well as to additional programming means, electronic or other, and to sensing apparatus whereby load, speed, temperature or other sensors may be utilized to monitor or control thruster functioning for belt tension control and/or other purposes.

In the drawings:

FIG. 1 is a semi-schematic plan view of a Reeves type transmission in which one form of the invention is utilized, including Phase II apparatus.

FIG. 2 is a semi-schematic partial elevation view of a form of the invention in which a single reciprocable member is utilized.

FIG. 3 is a semi-schematic illustration of structure whereby essentially the pulley control apparatus of FIG. 1 is supported in relative independence of the transmission frame.

FIG. 4 is an illustration of spiral camming apparatus whereby constant speed linear motion is convertible to variable speed rotary motion and vice versa.

FIG. 5 is a semi-schematic partial elevation of a form of the invention utilizing the spiral camming principle of FIG. 4 in mechanism positioned outside the transmission shafts.

FIG. 6 illustrates spiral camming apparatus utilized inside multi-component shafts and including brakes as Phase I means.

FIG. 7 illustrates details of thruster structure and multi-component shaft structure applicable to apparatus of FIGS. 6 and 8.

FIG. 8 illustrates a variant form of the apparatus of FIG. 6 in which single-unit spiral camming is utilized.

FIG. 9 illustrates a multi-component shaft form of the invention in which the inner shaft carries the variable pulley components and outer shaft components function as thrusters.

Briefly the variable speed control for varying the relative speeds of a pair of shafts includes a pulley on each shaft with each pulley having pulley elements which are movable with respect to the shaft and a belt interconnecting the pulleys with interconnecting means for causing the pulley elements of each shaft to move so the effective diameter of one pulley increases as the effective diameter of the other pulley decreases to control the relative speeds of the shafts. Control means also includes cam means which are operative on said interconnecting means to control the movement of said interconnecting means and thereby the movement of the pulley elements. The control means also include yieldable means in the form of springs which act on the interconecting means to maintain the desired force between the pulleys and the belt.

Referring more specifically to FIGURE 1, a pair of shafts 17' and 17" support pulley elements 10', 10" and 10''', and 10'''', respectively, and the pulley elements are moved together and apart by thrusters 3', 3'''', and 3'', 3''', respectively, by means of interconnecting lever means 1' and 1". Since the levers 1' and 1" are substantially identical, the description will be made with respect to lever 1' which is pivotally mounted by means of a pivot 4' which is slidably mounted in a pivot receiving slot in a slide 2' which is slidably mounted on guide rods 9', 9' suitably attached to a frame F in which the shafts 17' and 17" are rotatably mounted. Extending through the slide 2' is a threaded rod 16' which freely passes through the frame and has a shoulder S' which abuts the slide 2' and the inner end of the rod is threaded into a washer W' which is fixed to a spring 13', the other end of such spring having a rack 21' which engages with a pinion 22 which in turn engages with a similar rack 21" connected to the other spring 13 which is duplicated. The force of the springs 13 and 13' is controlled by the pinion 18 which is rotated by a control wheel on a control shaft 26. The springs are housed in housings 20' and 20 which may be locked relative to each other by means of a locking device 24 controlled by a rod 25.

The lever 1' has a cam 6' which reacts against a roller follower 7' on the slide 2' and the lever 1' and lever 1" are moved by a hand controlled lever 14 connected by suitable cables to extensions 11' and 11" of the control levers 1' and 1" to thereby move the cooperating pulley elements together or apart.

It will thus be seen that the present invention provides for varying the relative speeds of the two shafts while maintaining the pulley elements in operative relation at all times during the changing of the gear ratio or the relative speeds of the shafts.

An obvious alternative arrangement (not shown) of the above camming function is to use, in the position of roller 7', a toothed gear operating as a pinion in relation to a toothed rack portion carried by lever 1' in the place of profiled portion 6', in which case the lateral component of the compound motion would be determined by the non-circularity of either camming element with respect to circularity or non-circularity of the other. Thus the cam element portion of lever 1' would preferably be the arc of a circle, whereas the co-active gear corresponding to roller 6' would be non-circular in whatever pattern of non-circularity produces a desired pattern of control as Phase I programmer.

Force for Phase I functioning is introduced into the apparatus by means designed to avoid biasing the potential of lever 1' to execute the above-described compound motion. Thus lever 11' is appropriately structured for coplanar, co-pivotal oscillation in fixed relationship with lever 1' and has appropriate slide-pivot relationship with unilinear guide-frame supported pivot-bearing 12'. With appropriate linkage of any suitable type, such as pivoted levers and rods, pulleys and cable, or the like, levers 11', 11" are coordinated for unitized receipt of Phase I force at lever means 14. Any known suitable detent means (not shown) is provided for operation either with lever means or at any other suitable point of the linkage, say at pivot means 12', 12".

For explanation of Phase II functioning, attention is called to spring 13. Here it should be mentioned that any suitable resilient force means may be substituted for Phase II springs to be described. Appropriate fluid pressure devices, with their flexibility of operation and facility for remote and/or automated control, have advantages that in some cases warrant their higher initial cost.

Since FIG. 1 illustrates a four-thruster, spring 13 is bi-component and disposed between lever carrier boxes 2' and 2" in a manner potentially to move them toward each other, thus to move all thrusters so as to enlarge both pulleys simultaneously. But a dual thruster apparatus operable by the programmer device in the single lever version of FIG. 1 more conveniently uses a single component spring (not shown) and relatively simple adjustment means, which will now be described before describing the more complex bi-component spring adjustment means and the lock-down means, the latter of which may be substantially the same for both types of spring. Thus for single component springs there is at 16 a handscrew which passes slidingly through a bore in the frame to penetrate lever carrier box 2' with relative rotatability therewith but substantial fixity therein against relative linear motion, this penetration extending through so as to threadedly engage appropriate mating threaded means retained in an end of spring 13. Thus spring 13 has one end attached to lever carrier box 2' by mediation of handscrew 16 and its other end non-rotatably supported fixedly with reference to the transmission frame so that rotation of handscrew 16 adjusts the amount of potential force communicable between spring 13 and lever carrier box 2', thus altering Phase II force potential against thrusters 3', 3" with consequent pulley-changing results when used in appropriate types of transmissions.

Returning now to spring 13 in the bi-component version illustrated, the adjustment means shown is a dual-rack-single-pinion apparatus including pinion 22 and racks 21', 21", the two racks appropriately attached to adjacent ends of the two spring components respectively. Frame 19 encompass portions of racks 21', 21" and also supports the bearing in which axis-shaft 18 of pinion 22 turns. Shaft 18 is extended and equipped with such universal joint, telescoping means, off-set gearing, or like arrangement 26 as necessary to provide a detent-equipped (not shown) hand-wheel or the like conveniently positioned outside the transmission. Preferably the rack-contacting portions of frame 19 are furnished with rollers (not shown) adjustable as to pressure upon the back sides of racks 21', 21".

At 20' and 20" are telescopic cylindrical elements shown in longitudinal section which together encompass spring 13 (whether single or bi-component) to comprise, along with clamp means 24, the principal elements of Phase II lock-down apparatus. Clamp means 24 may be either of "drawstring" or caliper type (details not shown) and is secured to element 20' for clamping action on and around element 20" in response to detent-equipped (detent not shown) operator linkage 25, which may be of any appropriate type. The interior surface of clamp 24 is furnished with cleats, studs, corrugations or the like 27' for interlock with corresponding deformation 27" of the outer surface of element 20". Thus with clamp 24 in "open" position spring 13 operates with resilient force potential as determined by adjustment of means 26, but with "closing" action of means 25 spring 13 may be locked down at any length as indicated in terms of position of telescopic element 20' in relation to telescopic element 20", thereby freezing Phase II force potential at that particular level.

In case of fluid or other resilient force means substituted for spring means, regulative apparatus of any appropriate known type is used, along with lock-down means analogous to the above. Obviously various arrangements of relatively telescopic or relatively extensible elements may be used, whether with spring or spring substitute means.

Drive pulley differential in this instance is provided in the form of lever-stops 28', 28" shown for operation with levers 1', 1" in close proximity to paired thrusters, say 3", 3''', which are effective directly on pulley 10'''-10''''. Stops 28', 28" may be drawn together against their respective levers by means of support tracks in uni-linear guide-frames 29', 29" through appropriate operation of cable linkage 31 over cable-pulleys 30', 30", which have axial support fixed in relation to the frame. This stop means lies in a plane positioned to avoid interfering with other apparatus, consequently stops 28', 28" are appropriate elongated and structured to engage respective levers 1', 1". Linkage 31 extends outside the transmission and includes suitable detent-equipped lever, reel or other operator means. This differential means probably is superfluous in most transmission applications and is optional primarily as a means of counteracting any slack or springiness of the thruster control apparatus most likely to occur under short term conditions such as in starting off under heavy load.

FIG. 2 illustrates semi-schematically apparatus appropriate for the same transmission as that of FIG. 1. Pulley control elements, pulleys, belt, transmission frame and bearings are omitted. The main elements of thruster activation (as will be detailed later) are supported in a plane parallel to the plane common to shafts 33', 33" but at sufficient distance therefrom to avoid interference with the pulleys and belt. Elements 35′ thru 35⁗ constitute cam-follower thrusters supported at their bases by pairs in unilinear guide-frames 41′, 41″ for motion parallel to shafts 33′, 33″. Cam-guides 37′ thru 37⁗ are in the form of patterned tracks and together constitute the Phase I programmer of the apparatus, each track slidably and embracingly engaging its cam-follower-thruster. By preference each cam follower thruster is provided with separate appropriate rollers on its guide-frame contacting portion and its cam track contacting portion, respectively. All four tracks (or cam guides) are rigidly supported by attachment to slide beam 34, which is itself supported on unilinear guide frames 36′, 36″ for motion perpendicular to shafts 33′, 33″. When linearly reciprocatory motion is applied to slide beam 34 the programmer cam guides move the thrusters in Phase I function as previously described under FIG. 1.

Obviously any deviation of cam guides 37′ thru 37⁗ from perpendicularity with respect to guide frames 41, 47″ (and thus to shafts 33′, 33″) results in motion of the came-follower-thruster in a manner potentially useful to move a pulley control element along shaft 33′ or 33″. Because the thruster elements of the illustrated conformation have structural disadvantages with respect to imparting firm and concentric thrust desirable for pulley control, the Phase II apparatus illustrated includes cable and pulley means utilizing Phase II force for reinforcing the said thrusters as extended at 40′–40⁗ in addition to its role in distributing Phase II force between the reciprocally functioning units, Thus cable 42 is endless and moves on a plurality of cable pulleys so positioned on thrusters as to maximize their smooth functioning, the cable pulleys at 40′–40⁗ being so placed as to avoid causing cable 42 from interfering with the transmission pulleys. Bi-component spring 38 is suspended between the axes of divider cable pulleys 39′, 39″, whose axes may be either "floating" or supported by appropriate unilinear guide frames, but the cable pulleys at 43′, 43″ have axes fixed with respect to the frame. In other respects the Phase II apparatus operates the same as that of FIG. 1, including adjustment and lock-down means (not shown). Alternatively to the above pulley and cable arrangement, pivoted levers, rack and pinion, or other suitable arrangement may be used, in which case the thruster members may be reinforced by "out-rigger" structure whereby each thruster element is in effect the vertical of a right angle triangle whose base has full length support in its unilinear guide frame.

A combined arrangement for differential drive pulley control and for enlarging Phase II scope of resilience includes the provision of slidability along reciprocable beam 34 of the cam- element structure which is directly associated with the non-drive pulley thrusters, say that at 37′, 37″, combined with use of a dual choice detent or clutch means at 44 (details not shown). With this detent at 44 appropriately set, cam-element structure 37′, 37″ is slidable on 34 but fixed relative to the frame, hence Phase I force applied to 34 is effective only on cam-element structure 37‴, 37⁗. With means at 44 set on its second position, cam-element structure 37′, 37″ is free to slide on 34 under restrictions more responsive to Phase II force potential than would otherwise be the case.

To apply the thruster control principle to Fig. 2 to a diagonal arrangement it is only necessary to substitute for the appropriate member of each cam guide pair a guide means that is straight and perpendicular to its related shaft. In practice, in transmissions, however, the unnecessary components are dispensed with, including simplification of Phase II force distribution and communication linkage, all of which simplifications will be readily understood by anyone familiar with the art.

In FIG. 3 is illustrated a variant of the apparatus of FIG. 1 wherein the thruster apparatus is supported either substantially or completely independently of the rigid frame of the transmission and which is adaptable for use with a plurality of transmissions in "ganged" arrangement. As illustrated, 46 is a side of a rigid transmission frame to which base beam 37 is attached at only on juncture. However, no attachment at all is necessary provided both the transmission frame and beam 47 are fixedly supported with respect to each other. At 48 is a cross beam member parallel to and equidistant from the two parallel shafts of the transmission( not shown) and rigidly supported on base beam 47 at an appropriate distance from the plane occupied by the two parallel shafts, "appropriate" in this case having reference to provision of space for a belt member and for operability of apparatus carried on beam 48. At 49′ and 49″ are slide beams retained for lateral movement in a path perpendicular to beam 49 by unilinear guide frames 50′, 50″, respectively. At 51′ and 51″ are the two level carrier boxes complete with oscillatable levers and camming mechanism as described under FIG. 1, assemblies 51′ and 51″ being rigidly supported by means 49′ and 49″ in operative communication with components of the transmission in the manner described under FIG. 1.

At 52 is shown a single component slide beams 49′ and 49″. As illustrated, spring 52 is positioned remote from lever carrier box assemblies 51′ and 51″ on the assumption that it is to serve a plurality of such assemblies operative in a ganged arrangement of transmissions, beams 49′ and 49″ being extended accordingly. In ganged arrangements the size and positioning of spring 52 should be decided on basis of overall efficiency and economy, as is also the case with regard to the beams 48 and guide frames 50′ and 50″. For single transmission applications spring 52 would preferably be suspended in the space defined by a plane common to the lever assemblies 51′, 51″ and cross beam 48 in order to communicate force between 49′ and 49″ with greater efficiency than would be the case in the illustrated arrangement. At 53, 53″ are hand screws threaded through 49′ and 49″ respectively to communicate appropriately with spring 52 for Phase II force potential regulating thereof, lock-nuts 54′ and 54″ being provided as means for making fast the respective hand screws in a given position. Lock-down means of any suitable arrangement analagous to that described in FIG. 1 may be used. Apparatus for consolidation of controls, both Phase I and Phase II, may be provided by any convenient linkage, bearing in mind that arrangement similar in effect to that of FIG 1 to minimize biasing of Phase I–Phase II compound motion potential should be provided.

FIG. 4 illustrates the principle of spiral camming employed in forms of the invention next to be described. At 56 is a cylinder element with a plurality of spiral grooves 57′, 57″ which parallel each other throughout their length, but which may vary as to their comon pitch of grooving on different linear portions of cylinder 56. At 58 is a collar-like retainer element fitting slidably around cylinder 56 and supporting a mating plurality of roller or ball elements 59′, 59″ so disposed with respect to the inside perimeter of 58 as to fit rollably into grooves 57′, 57″. The inside perimeter of 58 has a circumferential groove which retains the balls 59′ and 59″ in operative position. At 60′, 60″ are cylindrical elements between which retainer 58, which, with inclusion of elements 59′, 59″ we may now call a cam follower, is supported for relative rotary motion but otherwise substantially fixed with respect to cylindrical portions 60′, 60″. At 61′, 61″ are mating splines operative to permit relative linear motion but to prevent relative rotary motion between portions 60′–60″ as a unit and cylinder 56 which is slidingly encompassed by 60′–58–60″ as a unit. Thus when 60′–60″ is held stationary while 58 is rotated, cylinder 56 is caused to move linearly at a speed variable according to variations in pitch of cam guide grooves 57′, 57″ even though the rotation of 58 may be at a constant speed. Conversely, when cylinder 56 is moved linearly, cam follower 58 is rotated with the same potential variability with respect to speed.

Obviously, variations may be made in the above arrangements without departing from the camming principle involved. For example, cam guide 57', 57" may be inside cylinder 56, and cam follower means 58', 59', may be supported on a shaft inside cylinder 56. But in all cases the cam guide spiral conformation, or multiples thereof, will constitute the programmer device of the thruster apparatus in which it is employed.

FIG. 5 illustrates an arrangement wherein the thrusters of the respective transmission shifts are responsive to single-unit spiral camming means associated with the respective shafts and positioned outside said shafts. Cylinders 62', 62" carry internal spiral cam guides 63', 63" as Phase I programmer and are extended to form thrusters 70', 70" which, with corresponding thrusters 70''', 70'''', are available to operate pulley control elements (not shown) in conventional manner with respect to shafts 73' and 73". (For simplicity, only one of duplicate arrangements will be cited except when reference to both is necessary for clarity.) Cam shaft 65' has cam follower means 67' coactive with cam guide 63' and also supports rotatively cylindrical element 66' which is retained against sliding on shaft 65, by the two thrust retentive means 64', 64". At 69' is a third cylindrical element encompassing the open end portion of 62' and extending telescopically in excess of half the length thereof, cylinder 69' having at its other end composite structure with cylinder 66'. This composite end structure is extended to form thruster 70". At 68' is single-pinion-dual-rack means of which the racks are attached to cylinders 62' and 69' respectively and the pinion turns on an axis fixed with reference to the frame (not shown), the pinion and racks so positioned as to cause thrusters 70' and 70" to be moved equidistantly in response to torque applied to cam shaft 65'. Cylindrical elements 62' and 69' are supported for motion parallel to shafts 73', 73" on appropriate unilinear guide frames (not shown). The bi-component spring means communicates with the thrusters of the apparatus by suspension between the axes of pinions 74', 74", the pinions in turn linked with respective dual rack means of which the racks of each set communicate by appropriate linkage with respective thruster pairs operating reciprocally with respect to each other, each functioning on different shafts. Alternatively, a pulley and cable arrangement such as that of FIG. 2 may be used, or other appropriate force distributive linkage. Phase II force adjustment and lockdown means (not shown) is as previously described under FIG. 1.

Cam shafts 65', 65" are extended respectively to support gears 71', 71" non-rotatably but slidably thereon, these gears being in association with rack means 72, which, by appropriate means such as pivoted lever, may then be moved linearly to impart Phase I force to the apparatus. Since in the illustrated apparatus shafts 65', 65" will reciprocate linearly to a certain extent, rack means 72 is provided with side and under structure. This under structure is slidable underneath adequate extended portions of shafts 65', 65", with the side structure of the rack being slidable laterally against flat side portions of pinion-gears 71', 71" in a manner to retain the rack and these dual pinions (or gears) in functional alignment and in gearing contact with rack 72, the matter of alignment being further assured by provision of appropriately positioned unilinear guide frame support (not shown) for rack 72. Any appropriate type of detent means may be employed, probably to best effect if applied to rack means 72.

FIG. 6 illustrates the double-unit spiral means heretofore described but now utilized in the first example of a "family" of forms of the invention in which much of the apparatus is incorporated in the transmission shafts which are multi-component and also include means whereby the primary force transduced by the transmission may contribute at least part of the force for Phase I functioning of the thrusters. This last is accomplished by brake apparatus utilized as a valving means with respect to the primary force diverted for Phase I use.

Thus in FIG. 6 outer shaft component 78' is the outer structure within which means to move the thrusters is encompassed. At 75'–75'''' are apertures cut through outer shaft 78' through which thruster components 86', 86'''' extend from cam guide cylinders 76', 76" respectively. FIG. 7 shows details of structure whereby thrusters such as 86'–86'''' may be provided under limitations incident to enclosure within a multi-component shaft. Thus the thruster and aperture arrangement of FIG. 6 (and that of FIG. 8 as well) is to be considered in the light of the various arrangements shown in FIG. 7.

At 82', 82" are brake means operable on inner shafts 83', 83" which have been appropriately extended outside shaft 78', 78". The brakes may be of any suitable known type, as for example, of caliper type, and equipped with linkage of Bowden cable type, unitized for single lever Phase I control as by level means pivotable in two planes as shown at 85, or like known means. Obviously, as result of braking, say at 82', cam shaft 83' will slow down relative to outer shaft 78'; the simultaneously resultant camming action will cause thrusters 86', 86" to move linearly in patterns of continuity determined by programmer cam guides 76', 76" respectively. Thrust communicative linkage including appropriate means at 79'–79'''' responsive to force potential of bi-component Phase II spring at 81 serves to induce 86''', 86'''' to be moved reciprocally to thrusters 86', 86" but in patterns of continuity determined by cam guides 76''', 76'''', respectively, associated therewith.

Phase I force applicator supplementary to the brake means is also provided by utilizing one "side" of Phase II linkage which preferably is provided with extra structural strength for this reason. The linkage may be of any type, including appropriate force distributive apparatus, illustrated and/or indicated in analogous arrangements heretofore. Thus at 77 is the pinion of a single-pinion-dual-rack force distribution arrangement, which is here equipped for double duty by being linked for receipt of rotational force from hand-wheel 84. Obviously the linkage between hand wheel 84 and pinion 77' must include appropriate gearing, including any necessary slip-joints, slide-pivot bearings, or like means whereby Phase I rotative force may be imparted to pinion 77' in a manner to minimize biasing against motion of said pinion and its axis as a unit in response to Phase II force potential of spring 81. (This is analagous to non-biasing means for prior instances of compound Phase I and Phase II motion potential.)

Drive pulley differential in all brake-equipped apparatus should be adequately provided through careful use of brakes in conjunction with the auxiliary Phase I force applicator. Detent means of any appropriate known type (not shown) may be provided at any suitable point in or on the above linkage 84 or by other means effective to prevent rotation of pinion 77' on its axis while permitting said pinion and its axis as a unit to respond freely to the Phase II force potential of spring 81.

Appropriate bearing means are provided to minimize friction between inner shaft 83', 83" during Phase I operation, preferably including linear motion detent means, the latter being essential in the case of two-thruster arrangements.

Otherwise, use of the above principle for two-thruster operation will be obvious insofar as Phase I programmer and thruster means are concerned, but not so obvious in other respects. In dual thruster arrangement Phase II apparatus includes single-component spring with dual-rack single pinion distribution linkage, or equivalent, as heretofore described. With this arrangement, the Phase I auxiliary force applicator apparatus is essentially the same as that described above for the four thruster arrangement.

In diagonal thruster arrangement Phase II apparatus is probably most simply provided by using a bi-component spring suspended between the pinion-axes of single-pinion-single-rack means (or equivalent) of which the racks are linked with the respective diagonally positioned thrusters in similar manner to that above described for the four-thruster arrangement. Also, the Phase I auxiliary force applicator is provided as above described.

FIG. 7 concerns structure and assembly of thrusters and multi-component shafts of which the arrangements of FIGS. 6 and 8 are examples. At (A) of FIG. 7 a thruster is shown as made up of four parts, namely, the elements 98′, 98″ which have the appearance of high shaft keys, cylindrical element 96 (which is also a cam element carrier), thruster-locking adapter body 97, and discoid end plate 94. Since it is desirable to minimize the thruster apertures in component 95 as well as the difference in inner and outer diameters of shaft components 95 and 96 respectively, it is recommended that not more than one of the "key" elements, say 98″, be integrally structured (as by forming or welding) with cylindrical componnt 96 prior to insertion of component 96 into its operative position inside outer shaft 95. As shown at 99 of FIG. 7(B) a doubly tapered "key-way" may be provided in component 96 for insertion of another "key" or "keys" as at 98′, after component 96 is in place in outer shaft 95. Then thruster element 97, designated "thruster-locking adapter," is drawn back to envelop all "key" elements so as to comprise an integrated thruster unit slidable but non-rotatable along and around outer shaft 95, guided by the thruster apertures therein. Element 96 may have tapered "key-ways" wherein elements 98′, 98″ with appropriate mating conformation are driven and appropriately fastened by "Allen" set screws, or the like, the mass and structure of element 97 at its "key" retaining portion being such as to provide adequate strength and rigidity to the unit as a whole, while the remaining portion thereof is appropriately structured to impart concentrically uniform thrust against a cone-pulley component. An end-plate or like discoid element, with appropriately formed inner structure, is fitted and fastened by screws or the like to the back of element 97 to secure and reinforce fixity of the enclosed "key" or like elements therein. Alternatively to the "key" conformations, studs of appropriate length may be threadedly engaged in bores provided in element 96 and similarly locked in appropriate conformations provided by thruster-locking adapter 97 and discoid unit 94.

Instead of the above arrangement, the outer shaft component may be provided with open-ended apertures or slits into which integrally structured and complete thruster units comparable to the above described separable unit may be inserted. Afterward still further alternatives are possible: (1) the slits may be terminated near enough the ends of outer shaft 95 and close enough to the bearings thereof (not shown) that said slits do not materially weaken or otherwise interfere with operation of said shaft as a whole; (2) the slits may terminate altogether outside said shaft bearings, the slidable, shaft-encircling portion of the thruster assembly itself thus forming a bearing-contacting sleeve element; (3) superfluous open-ended slit portions may be welded in and such portion of the shaft appropriately refinished; (4) as shown in shaft cross section at (C) of FIG. 7, sleeve element 100 is equipped with spline-like formation 101, 101′ to wedge-fit the linear slits in shaft 95 and is press-fitted telescopically over shaft 95 an appropriate distance, thus forming a fixed reinforcing element of shaft 95.

FIG. 8 illustrates apparatus with brakes the same as those of FIG. 6, but with a single camming unit per multi-component shaft instead of two, along with other less noticeable differences. Thus when brakes are applied, say at 103′, cam shaft 102′ will be retarded as to speed of rotation relative to outer shaft 108′, but the slow-down will energize a pattern of thruster-functioning determined by the programmer cam guides in cylinders 107′, 107″, the latter being forced to rotate the same as 108′ because of mating splines between 107′ and 108′ (not shown). Simultaneously, thruster units 109′, 109″, which include elements having mutually reverse threaded engagement on and around cam shaft 102′, are moved together or apart, as the case may be, in correlation with the pattern of continuity of speed of rotation of said cam shaft.

Note that cam shaft 102′ is prevented from moving linearly by appropriate anti-linear motion bearing means at 106′, which includes, for example, a two-way thrust-type bearing means retained in outer shaft 108′ and fixed therein with respect to linear motion therebetween, said bearing also being retained between the two components of a dual collar means fixed around cam shaft 102′ (details not shown).

Phase II is here the same as in FIG. 6 except that the thrust bearing means of one "side" are positioned on the respective cam guide cylinders at 104′, 104″. Thus the two cam guides respond coordinately to braking applied to either cam shaft. However, this coordination is made more positive by use of a mid-length pivoted oscillatable lever (not shown) interlinking the cam guide cylinders by sharing the connections at 104′, 104″ with the Phase II linkage. An auxiliary Phase I force applicator is provided either as in FIG. 6 or by appropriate extension of the above-mentioned oscillatable lever. Alternatively, Phase II apparatus identical with that of FIG. 6 may be used along with the above-mentioned oscillatable lever alone making use of bearings 104′, 104″. In any case, to provide increased scope for Phase II resilience arrangement is made by any suitable known means whereby a Phase I detent means is positively operative only in respect to one of the cam guides while leaving the other cam guide to react entirely by virtue of the Phase II interlinkage.

In the light of previous descriptions, adaptation of the above apparatus to diagonal thruster and dual thruster operation will be obvious to anyone familiar with the art.

FIG. 9 illustrates a four-thruster cone pulley application in which it is questionable whether to say that the shafts are bi-component or not, since the elements 112′, etc., either may or may not be extended to turn in the transmission bearings (not shown). But since in any case these elements rotate integrally with their respective inner shafts 113′, 113″, etc., at all times except during the actual pulley-changing process, it seems fair to consider them shaft components as well as thrusters. Obviously the basic principle here is the same as that of prior spiral cam guide examples of the invention wherein brake means as well as auxiliary lever means are provided for Phase I operation. The latter is indicated at 114 and is essentially the same (as also are the brake means) as analogous apparatus of FIGS. 6 and 8. At 115′ are indicated single-pinion-dual rack apparatus of which the rack portions interlink shaft-mate thrusters by utilizing portions of Phase II thrust linkage. This apparatus is superfluous in the illustrated arrangement wherein each thruster has its own camming mechanism operated with the respective inner shaft but is shown here to illustrate the possibility of using only one set of camming elements per transmission shaft.

Since the brakes here operate on an outer shaft component, for example 112′ and 112″ of each multi-component shaft, and since these elements also function as thrusters and hence are reciprocable, it is advisable to provide unilinear guide-frame support for the brakes 117′, 117″. Also, since inner shafts (or cam-shafts) 113′ and 113″ also function as carriers of the primary force transduced by the transmission, it is necessary to provide space for pulleys or the like on these inner shafts. This can be done in several ways. The outer components may be of such length as to be fully supported in the transmission bearings at all times, with the inner shafts protruding past the outer component at one end of respective multi-component shafts to provide adequate pulley space; or the outer components may be so short that they end short of the transmission bearings, thus leaving space for the respective primary force pulleys on one side or the other of relevant transmission bearings.

Apparatus substantially reversing the arrangement of FIG. 9 may be described without necessity of further illustration. In this arrangement shaft components 112, 112" are mutually telescopic or interpenetrating with reference to communicating primary torque force transduced by the transmission. The hub structure of the paired pulley cones on each shaft may well be integral with the "inter-penetrating fingers" conformation or like means of the respective telescopic portions, and the telescopic portions also may be oversize and equipped with anti-friction balls or rollers between the mutually engaged friction surfaces.

In this instance the brakes operate on the inner or camshaft components of the multi-component shafts, and provision for the necessary shaft space is made analogously to arrangements for torque fixtures (or pulleys) as described above. But in providing for these pulleys for primary force communication, arrangement must be made whereby they are retained in a fixed plane for operation of their belt or like means. This is done by providing slidable, non-rotatable, shaft mounting of the pulleys along with appropriate detent means consisting, for example, of collars attached to the respective pulley hubs with each collar enlarged between bearings carried by means fixed to the frame.

Diagonal thruster and dual thruster arrangement of this form of the invention are analogous to corresponding arrangements previously described.

Heretofore no specific reference has been made to applications of thruster arrangements of the invention to segmented-rim pulley transmissions. For such transmissions operable by linear thrusters positioned outside the shafts, it is obvious that all forms of the invention, including FIG. 9, are applicable with relatively minor adaptations of thruster conformmation to suit specific pulley-structuring apparatus. For those operable by means enclosed in a rotating multi-component shaft unit somewhat more radical adaptations need be made. However, even this is largely a matter of appropriate conformation of the thruster, and is well within the adaptive scope of anyone skilled in the art. Thus the apparatus of FIGS. 1, 2, 3, and 5 may be said to be adaptable to internal thrust-shaft transmission in essentially the form illustrated, especially in either diagonal or dual thruster adaptation.

However, forms of the invention shown under FIGS. 6 and 8 seem most attractive for internalized applications, either thrust-shaft or rotative shaft. Thus, in the case of two-thruster apparatus under FIG. 6 it is very simple to adapt the cam-shafts thereof to function as internal thrust means as follows: the inner cylindrical cam guide means are integrated with the outer shaft components, the non-thruster-adapted ends of the respective cam shafts are extended outside the outer shaft a sufficient distance to support brake means and Phase II force communication means thereon, a unilinear guide-frame is provided to support the brake means for motion in accommodation to the reciprocable motion of the cam shafts, the thruster-functioning ends of the cam shafts given such conformation as required for communicating thrust to the pulley-structuring mechanism in question, and Phase I means analogous to prior apparatus is provided. Similarly easy and obvious changes in two thruster forms of the apparatus of FIG. 8 adapt it for internal thruster applications while for internal rotative shaft applications it is only necessary to omit the threaded inner cylinder elements and mount pulley-operative gearing means on one end-portion of the cam shaft, provide brake means and Phase II means on the other end of the cam shaft which has been appropriately protruded past the end of the outer shaft for the purpose, and provide Phase I means analogously to and with the options of prior corresponding apparatus.

It should be noted that in several forms of the invention, Phase I apparatus rather closely limits the scope of Phase II resilient potential unless appropriate measures are taken. Thus with the apparatus of FIG. 2 a detent means is provided whereby the thrusters operative on one variable pulley may at option be freed from Phase I force except insofar as it is routed through the Phase II means, thus greatly increasing scope of resilient potential of the apparatus. In the shaft-externalized spiral apparatus, opening the Phase I clutch means on one cam-shaft has the same effect. In the brake-equipped apparatus in which the Phase I auxiliary force applicator utilizes only one side of the Phase II linkage, there is greater scope of Phase II resiliency without taking special measures, with the exception of the FIG. 8 version. In the latter it was necessary to provide disconnect means on one cam cylinder for the Phase I oscillating lever auxiliary force applicator in order to materially increase Phase II resiliency potential beyond that afforded by the "slack" in the Phase I mechanism.

I claim as my intention:

1. A variable speed control for varying the relative speeds of a pair of shafts comprising a pair of shafts, each shaft having a pulley made of pulley elements arranged for movement with respect to its shaft, a belt interconnecting said pulleys, interconnecting means causing the pulley elements of each shaft to move so the effective diameter of one pulley increases and the effective diameter of the other pulley decreases to control the relative speeds of the shafts, control means including cam means operative on said interconnecting means to control the movement of said interconnecting means, said control means also including yieldable means connected to and reacting between said cam means and said interconnecting means to maintain the desired force between the pulleys and the belt, and means to actuate said cam means.

2. The invention according to claim 1 in which the interconnecting means is a pair of levers mounted on slides and the cam means reacts between the slides and the levers.

3. The invention according to claim 1 in which the yieldable means is spring means.

4. The invention according to claim 2 in which the yieldable means are spring means which react between the slides.

5. The invention according to claim 4 in which threaded rods provide for the adjustment of the force of the spring means.

6. The invention according to claim 1 in which the interconnecting means includes generally helical groove means and cooperating follower means.

7. The invention according to claim 6 in which one of the helical groove means and follower means is positively adjustable.

8. The invention according to claim 6 in which one of helical groove means and follower is movable by the reaction of the shafts which are rotating.

9. The invention according to claim 2 in which the shafts and levers are mounted on a frame and cables extend to the levers and are operatively connected to a hand controlled lever for causing the levers to move to change the relative speeds of the shafts.

10. The invention according to claim 1 in which means are provided to render the yieldable means inoperative.

11. The invention according to claim 4 in which the spring means is coil spring means and telescoping means are provided to encase the coil spring means and means are provided to lock the telescoping means to limit the spring motion.

12. The invention according to claim 11 in which the telescoping means are locked to prevent operation as said coil spring means.

13. The invention according to claim 1 in which the pulleys are V-pulleys.

14. The invention according to claim 1 in which means are provided to vary the force of the yieldable means.

15. The invention according to claim 14 in which means are provided to limit the action of the yieldable means.

References Cited

UNITED STATES PATENTS

| 596,281 | 12/1897 | Spaulding | 74—234.17 XR |
|---|---|---|---|
| 2,296,297 | 9/1942 | Smith | 74—230.17 XR |
| 2,702,484 | 2/1955 | Arata | 74—230.17 |
| 2,909,072 | 10/1959 | Karig | 74—230.17 |
| 589,989 | 9/1867 | Griffiths. | |
| 949,265 | 2/1910 | Cutter. | |
| 1,727,232 | 9/1929 | Farrell. | |
| 3,138,033 | 6/1964 | Glasson et al. | |

FOREIGN PATENTS 1,048,015  7/1953  France.

FRED C. MATTERN, JR., Primary Examiner

M. A. ANTONAKAS, Assistant Examiner